United States Patent [19]

Mayer

[11] 4,290,559

[45] Sep. 22, 1981

[54] END CONTROL, ELECTRICAL, POWER DRIVE UNIT FOR AGRICULTURAL SPRINKLER IRRIGATION SYSTEMS

[76] Inventor: Russel Mayer, P.O. Box 811, Milford, Utah 84751

[21] Appl. No.: 110,931

[22] Filed: Jan. 10, 1980

[51] Int. Cl.³ ............................................. B05B 3/18
[52] U.S. Cl. ................................. 239/716; 180/14 R; 180/70 R; 239/721
[58] Field of Search ............... 239/212, 213, 177, 178, 239/712, 713, 716, 718, 721; 137/344; 74/421 R, 421 A; 180/14 R, 24.12, 70 R

[56] References Cited

U.S. PATENT DOCUMENTS

| | | | |
|---|---|---|---|
| 3,318,531 | 5/1967 | Funk | 239/212 |
| 3,978,882 | 9/1976 | Cornelius | 239/212 |
| 4,153,070 | 5/1979 | Marcotte | 239/212 |

Primary Examiner—Andres Kashnikow
Assistant Examiner—Michael J. Forman
Attorney, Agent, or Firm—Mallinckrodt & Mallinckrodt

[57] ABSTRACT

An electrical, end control, power drive mover unit for agricultural sprinkler irrigation systems comprises oppositely mounted, dual electric motors adapted to revolve about a stationary bull gear by reason of drive pinions respectively driven by the motors. The motors are structurally supported and rigidly secured to a rotatable sprinkler pipe section by means of respective, mutually substantially symmetrically oriented platforms, advantageously respective lengths of structural channel, that serve to also support respective speed reducing gear boxes, desirably in-line with the associated motors. Structural means, advantageously in the form of an annular plate rigidly secured to the sprinkler pipe section, serves, in turn, to rigidly fasten the platforms to the sprinkler pipe section at diametrically opposite positions thereon. The sprinkler pipe section is rotatably carried by a tubular bearing, which is rigidly attached to the chassis frame of the mover unit for the system and to which the bull gear is rigidly secured. Sprockets affixed to the sprinkler pipe section serve to drive traction wheels of the mover unit in synchronism with rotation of the sprinkler pipe.

5 Claims, 7 Drawing Figures

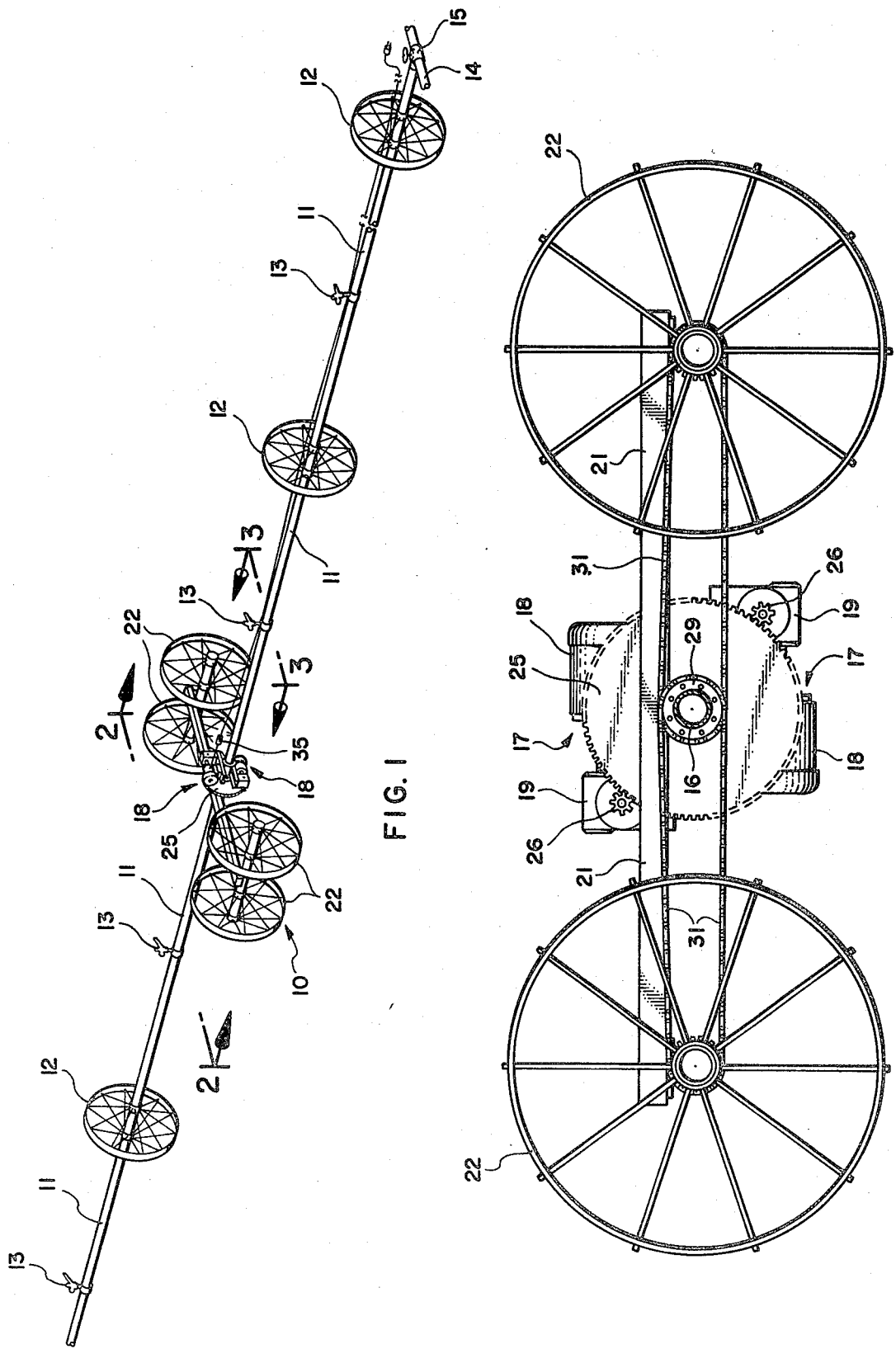

END CONTROL, ELECTRICAL, POWER DRIVE UNIT FOR AGRICULTURAL SPRINKLER IRRIGATION SYSTEMS

BACKGROUND OF THE INVENTION

1. Field

The invention has to do with agricultural sprinkler irrigation systems as customarily employed for movement successively from place to place along a field across which the sprinkler pipe of the system extends, thereby blanketing the field with sprinkler-provided water.

2. State of the Art

Sprinkler irrigation systems of the type concerned are widely used to supply needed irrigation water in a manner simulating natural rainfall, as contrasted with time-honored irrigation ditch systems for supplying running water directly to the roots of growing plants from furrows leading from supply ditches and extending between crop rows.

Such sprinkler irrigation systems customarily include a mover unit having traction wheels driven from an internal combustion engine, an electric motor, or hydraulic motor mounted on the unit. The mover unit is located centrally or near centrally of wheel-supported, end-to-end-coupled, sprinkler pipe sections extending across the field to be irrigated, and is reached only after a long walk across the field. To avoid frequent long walks by the person in charge of the system, various remote control arrangements have been provided for starting and stopping the engine or motor on the mover unit, see for example, Vollmer U.S. Pat. No. 4,016,902 issued Apr. 12, 1977, for "End-Control Agricultural sprinkler Irrigation Systems" and Cornelius U.S. Pat. No. 3,978,882 issued Sept. 7, 1976 for "Mover Unit for Irrigation Line".

Electric power is particularly advantageous, since remote control is achieved easily at an end of the coupled pipe sections by merely plugging into and out of an electrical supply line at successive locations along the extent thereof at a side of the field. However, since an electrical cord or cable must extend along the rotating sprinkler pipe sections to electrical connections with the electric motor or motors utilized to drive the mover unit of the system, a slip ring is normally required for this purpose if end control is to be achieved. This causes complications, both in construction and maintenance of the system. The only electrical system known to applicant is that produced by Elmer Funk, the patentee of U.S. Pat. No. 3,318,531, issued May 9, 1967 for "Irrigation Pipe Propelling Apparatus". Although the patent shows and describes a system powered by an electrical generator aboard a tractor that is movable with the system from irrigating location to irrigating location along the length of the main water-supply pipe, and an electric motor driving a pinion gear which is in mesh and adapted to travel around the circumference of a stationary reaction or bull gear to effect rotation of the sectional irrigation pipe and the traction wheels supporting same in the field, the electric motor and speed reduction gear box of such arrangement traveling around the reaction gear along with the drive pinion, and there being a slip ring connection between the generator and the motor, in actual practice this is not used. Rather, the electric motor is mounted so as to be stationary, and the reaction gear is rigidly fixed to the sectional irrigation pipe so as to be driven by the pinion and, in turn, rotate the pipe. A slip ring connection is provided between the pipe-carried electric cord or cable and the electric motor, so that plug-in connections can be made with a source of electric power at convenient locations along a side of the field as the system is moved from place to place successively.

SUMMARY OF THE INVENTION

In accordance with this invention, a construction is provided whereby the rotating, sectional, irrigation pipe is effectively driven by electric power supplied by a cord or cable extending along the rotating irrigation pipe, without slip ring electrical connection. Two electric motors and respective speed-reducing gear boxes are utilized in balanced arrangement and in stress-resisting structural connection with the mover unit piper section of the elongate irrigation pipeline for rotating such pipeline in much the same way Funk proposed in his patent but did not put into commercial practice, undoubtedly because of structural difficulties now overcome by this invention. The two motor-gear box sets are securely and substantially symmetrically mounted on respectively, mutually substantially symmetrically oriented platforms, advantageously in straight-line arrangement on the respective platforms which are advantageously of elongate, structural channel formation extending transversely across the to-be-rotated pipe section in a mutually balanced, diametrically opposite relationship, and are rigidly fastened thereto, advantageously by an annular disc plate encircling such pipe section and projecting outwardly therefrom. Pinion gears are driven by the respective motors and, in turn, drive the pipe section on which they are mounted by revolving about a stationary bull gear serving as reaction means. The platforms, the electric motors, and the speed-reducing gear boxes revolve about the axis of rotation of the irrigation pipe section on which they are mounted, and no slip ring electrical connection with the power-supplying electrical cord or cable is required because all move together about the axis of rotation of the irrigation pipeline. At the plug-in end of such cord or cable enough length can be left so that twisting by reason of the rotation is no problem.

THE DRAWINGS

In the drawings, which illustrate the best mode presently contemplated for carrying out the invention:

FIG. 1 is a pictorial view of the system as set up in a field for irrigating purposes, portions of the irrigation pipeline being broken out for convenience of illustration;

FIG. 2, a vertical transverse section taken along the line 2—2 of FIG. 1 and drawn to a larger scale;

FIG. 3, a fragmentary, transverse, vertical section taken along the line 3—3 of FIG. 1 and drawn to a scale considerably larger than that of FIG. 2;

FIG. 4, a top plan view of the motivating portion of the system as shown in elevation in FIG. 3;

FIG. 5, an axial vertical section taken along the line 5—5 of FIG. 3;

FIG. 6, a transverse, vertical section taken along the line 6—6 of FIG. 4; and

FIG. 7, a transverse, vertical section taken along the line 7—7 of FIG. 5.

DETAILED DESCRIPTION OF ILLUSTRATED EMBODIMENT

Figure 4:
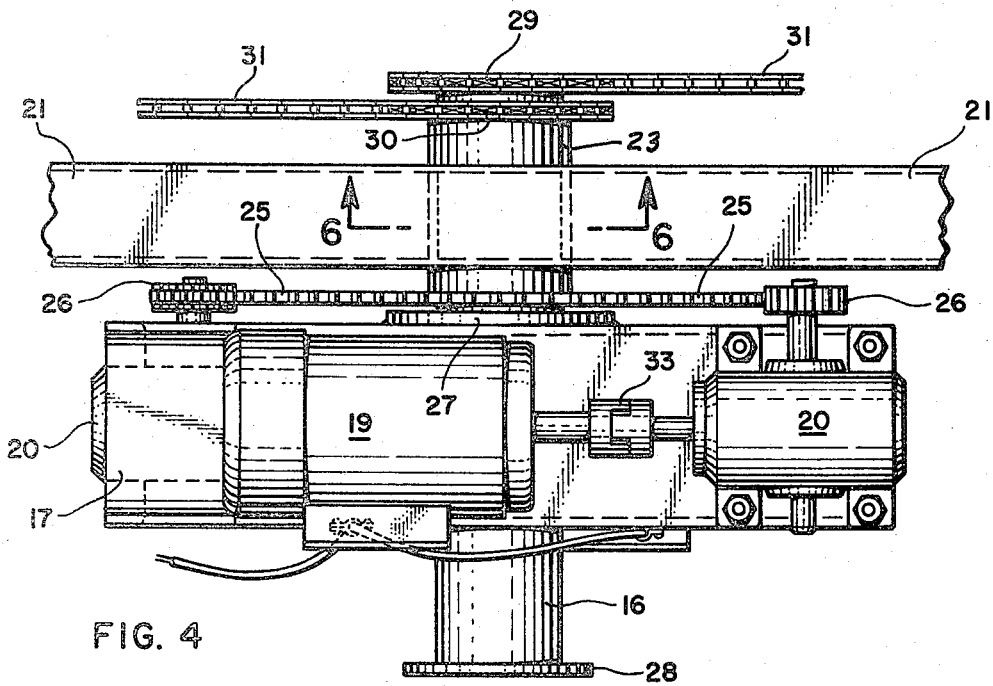

A typical agricultural irrigation sprinkler system equipped with a power drive unit 10, representing the best mode of the invention as presently contemplated, is illustrated in FIG. 1 and comprises an end-to-end-connected series of sprinkler pipe sections 11 provided with wheels 12 and sprinkler heads 13 for travel from place to place across a field to be irrigated. When set at a particular location, the assembly of sprinkler pipe sections is temporarily connected to a supply pipe 14 for irrigation water, which pipe extends along one edge of the field and has connection fittings 15 at appropriate intervals along its length.

Figure 3:
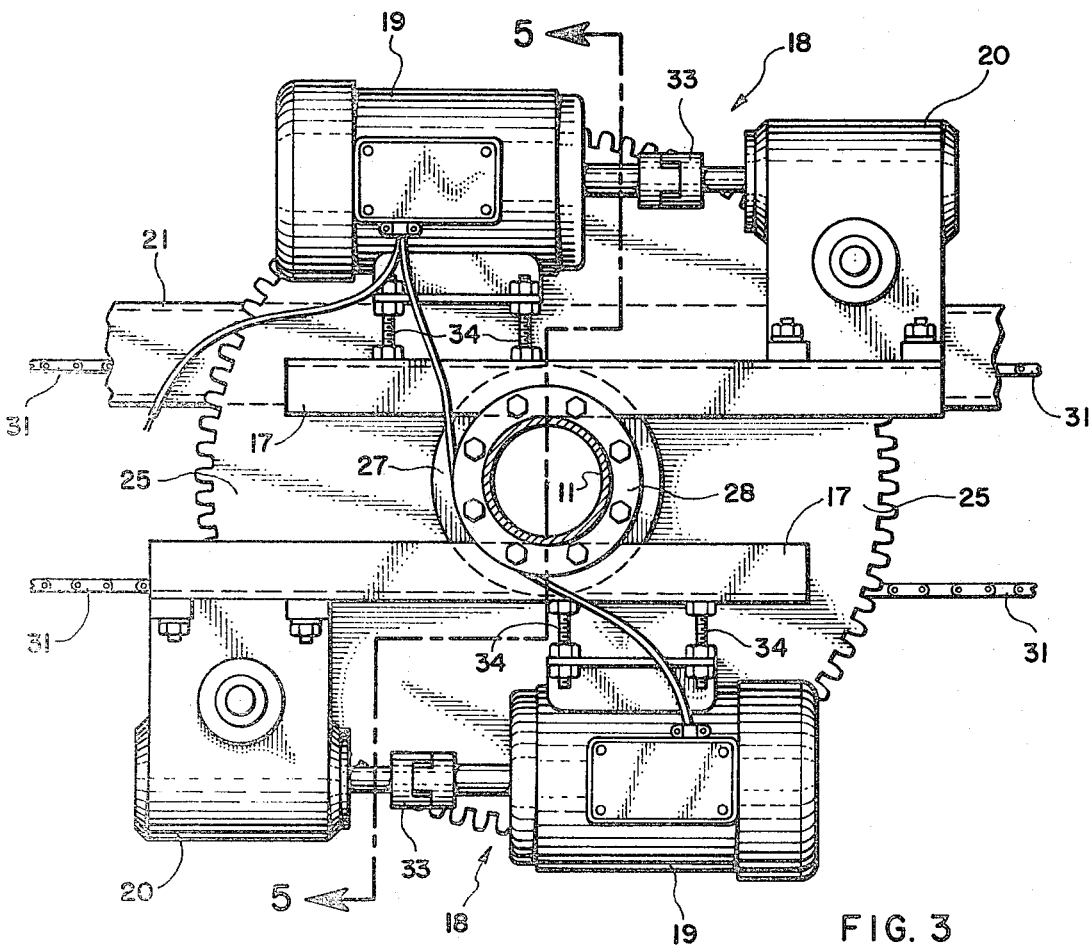
Figure 5:
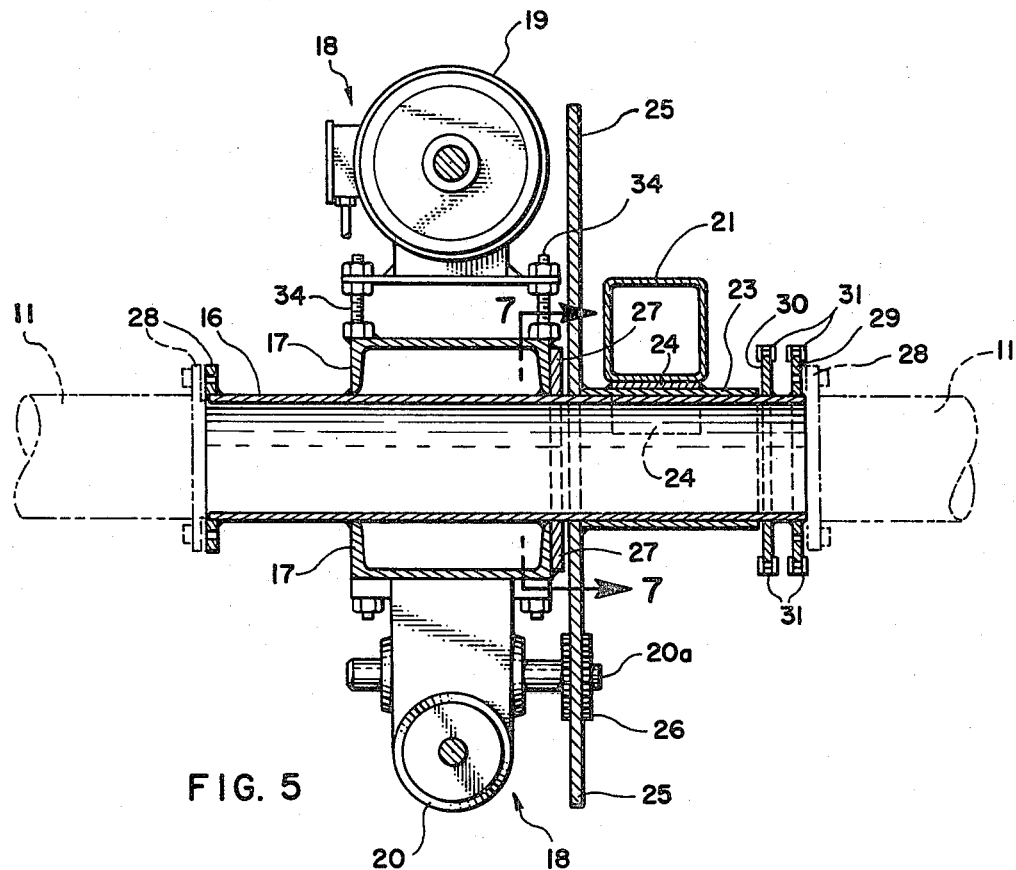
Figure 6:
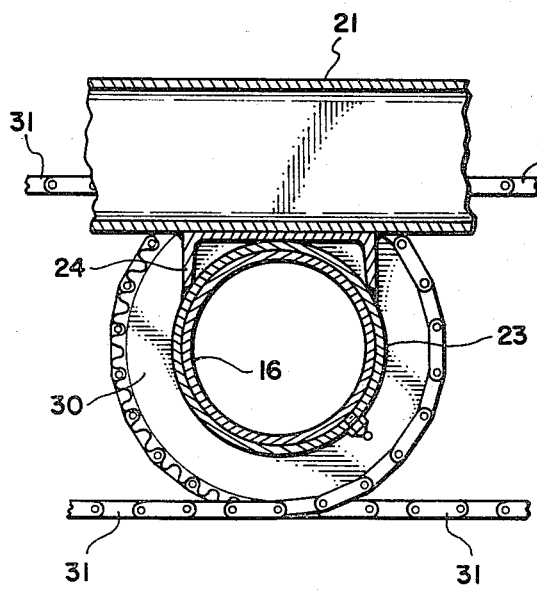

In accordance with the invention, power drive unit 10 is provided with a rotatable pipe section 16, which supports and fixedly carries dual, mutually substantially symmetrically oriented platforms 17, respectively, FIGS. 3 and 5, on which are mounted opposite, mutually substantially symmetrically oriented power drive sets 18, respectively, each comprising an electric motor 19 and speed reducing gear box 20.

As customary, power drive unit 10 comprises a rigid frame 21 equipped with and supported by traction wheels 22. Pipe section 16 is rotatable within an elongate bearing 23 rigidly affixed to frame 21 as by means of welding to an intermediate structural channel member 24 which is welded, in turn, to frame 21, see particularly FIG. 5.

A bull gear 25 is rigidly affixed to an end of bearing 23 adjacent to platforms 17, again as by means of welding, so as to be held stationary thereby. Rotation of pipe section 16 is effected by pinions 26, respectively, which are rigidly affixed to respective drive shafts 20a extending from respective speed reducing gear boxes 20 and which mesh with bull gear 25 in diametric opposition thereacross.

Figure 7:
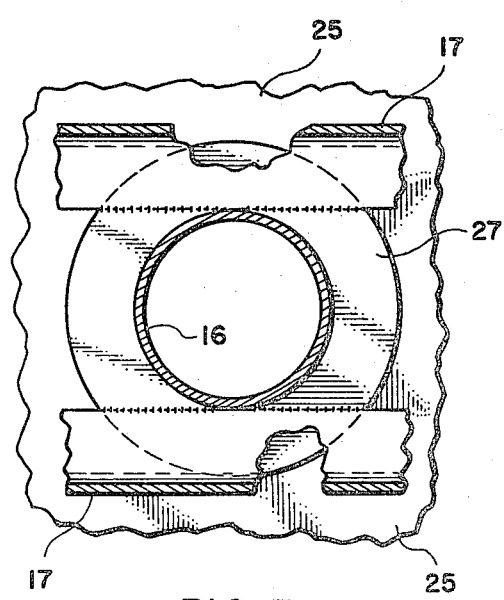

Platforms 17 are advantageously elongate and mutually parallel, extending transversely of pipe section 16 in diametric opposition thereacross, so as to support the respective sets 18 of motor 19 and gear box 20 in desirable in-line formation. For structural strength and resistance to stress by reason of rotation under the heavy loads carried thereby, such platforms 17 are desirably respective lengths of structural channels and are rigidly affixed to such pipe section 16 by structural means which are advantageously in the form of an annular disc plate 27, FIG. 7, encircling pipe section 16 and rigidly secured thereto as by welding.

Rotation of pipe section 16 effects rotation of both the therefromextending lengths of sprinkler pipe 11 and the traction wheels 22 of power drive unit 10. For this purpose, sprinkler pipe sections 11 are rigidly coupled together in well-known manner (not shown) and to opposite ends of pipe section 16 by means of flanges 28, one of which is coupled to a sprocket wheel 29, FIG. 5, that is rigidly affixed to pipe section 10 and conveniently serves in place of a flange. A second sprocket wheel 30 is similarly provided, and sprocket chains 31, respectively, connect the respective sprocket wheels to drive sprockets 32, respectively, FIG. 2, rigidly mounted on the axles of front and rear sets of traction wheels 22.

Electric motors 19 and speed reducing gear boxes 20 of the respective sets 18 are shown as standard commercial items. For in-line connections by standard couplings 33, motors 19 are secured on the respective platforms 17 in elevated positions by means of standard adjustable mountings 34, FIGS. 3 and 5.

Electric motors 19 are powered by suitable electrical connections, indicated 35, FIG. 1, with an elongate electrical power cable, which extends along and is secured to one of the oppositely extending lengths of coupled sprinkler pipe sections 11 at the sides of power drive mover unit 10. Such power cable terminates in a plug 36 or other suitable electrical connecting device for temporary connection with an electrical power outlet (not shown) or one of several such outlets strategically located along the side of the field to be irrigated, and is sufficiently long so twisting by reason of rotation of the sprinkler pipe presents no problem. Thus, it can be seen that no slip ring electrical connections are required.

A three horsepower, three phase electric motor running at 1740 RPM and a forty to one speed reducing gear box have been found to be entirely satisfactory.

Whereas, this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

What is claimed is:

1. An electrical, end control, power drive mover unit for agricultural sprinkler irrigation systems, comprising a wheeled frame having a pipe section of an irrigation sprinkler pipeline rotatably mounted thereon substantially parallel with the axes of rotation of the wheels thereof; a bull gear rigidly affixed to said frame and encircling said pipe section; dual, mutually substantially symmetrically oriented, structurally separate platforms rigidly attached in mutually parallel relationship to and supported by said pipe section in diametric opposition to each other and adjacent to said bull gear; structural means rigidly affixing said platforms in common to said pipe section, said structural means comprising an annular disc plate encircling the pipe section at a side of said platforms and rigidly affixed thereto; electric motor and speed reducing gear box sets mounted on the respective platforms in mutually substantially symmetrical orientation, the gear box of each set having an output shaft with a pinion drive gear thereon in mesh with said bull gear; an electrical connection for an elongate electrical power cable which is adapted to extend along the irrigation pipeline to an end thereof for connection with a source of electric power; and drive means connecting said pipe section with wheels of said wheeled frame for moving the mover unit when the electric motors are energized.

2. A mover unit according to claim 1, wherein each platform is elongate, and the motor and gear box of each set are independent units coupled in an in-line arrangement.

3. A mover unit accordiing to claim 2, wherein each platform is a length of structural channel.

4. A mover unit according to claim 3, wherein the pipe section is journaled in an elongate bearing which is rigidly affixed to the wheeled frame, and the bull gear is rigidly affixed to one end of said bearing adjacent to the annular disc plate.

5. A mover unit according to claim 4, wherein the wheeled frame comprises rotatable axles to which traction wheels are rigidly affixed; the drive means connecting the pipe section to the wheels of the wheeled frame comprises sprocket wheels rigidly affixed to said pipe section and other sprocket wheels rigidly affixed to said axles, and sprocket chains interconnecting said sprocket wheels with said other sprocket wheels.

* * * * *